United States Patent [19]

Veneziano et al.

[11] Patent Number: 5,568,700
[45] Date of Patent: Oct. 29, 1996

[54] STAND-OFF DEVICE FOR YIELDINGLY SUPPORTING A TREE TO A TREE SUPPORT STAKE

[76] Inventors: Michael Veneziano, 1332 Shattuck Ave., #15, Berkeley, Calif. 94709; Mark Icanberry, 2436 Spaulding Ave., Berkeley, Calif. 94703

[21] Appl. No.: 478,888

[22] Filed: Jun. 7, 1995

Related U.S. Application Data

[63] Continuation of Ser. No. 184,988, Jan. 24, 1994.

[51] Int. Cl.$^6$ ......................................................... A01G 7/00
[52] U.S. Cl. ...................................... 47/43; 47/42; 248/156
[58] Field of Search ................................... 47/42 R, 43 R; 248/156, 231

[56] References Cited

U.S. PATENT DOCUMENTS

| | | | |
|---|---|---|---|
| 2,462,442 | 2/1949 | Wallace | 47/43 R |
| 3,010,256 | 11/1961 | Ise | 47/43 R |
| 3,526,056 | 9/1970 | Stropkay | 248/231 |
| 4,222,198 | 9/1980 | Napolitano et al. | |
| 4,307,540 | 12/1981 | Reisner | 248/156 |
| 4,381,621 | 5/1983 | Eby | |
| 4,649,666 | 3/1987 | Ness et al. | |
| 4,738,050 | 4/1988 | Dickinson | |
| 5,020,192 | 6/1991 | Gerlach | |

FOREIGN PATENT DOCUMENTS

| | | | |
|---|---|---|---|
| 1533875 | 11/1978 | United Kingdom | |
| 2124874 | 2/1984 | United Kingdom | |
| 2241143 | 8/1991 | United Kingdom | 47/43 R |

*Primary Examiner*—Terry Lee Melius
*Assistant Examiner*—Joanne C. Downs
*Attorney, Agent, or Firm*—Donald L. Beeson

[57] ABSTRACT

A stand-off device for yieldingly supporting a tree to a tree support stake has an elongated body and an elastomeric cord which extends through the body and which has a tie end extending from the body's distal end so that can be tied to the trunk of a tree either directly, or by means of an intermediate tree tie. By attaching the stand-off device to a tree support stake, a tree can be held upright at the end of the device win a windless condition, yet being allowed to sway in the wind so that the growth and health of the tree will be stimulated.

21 Claims, 4 Drawing Sheets

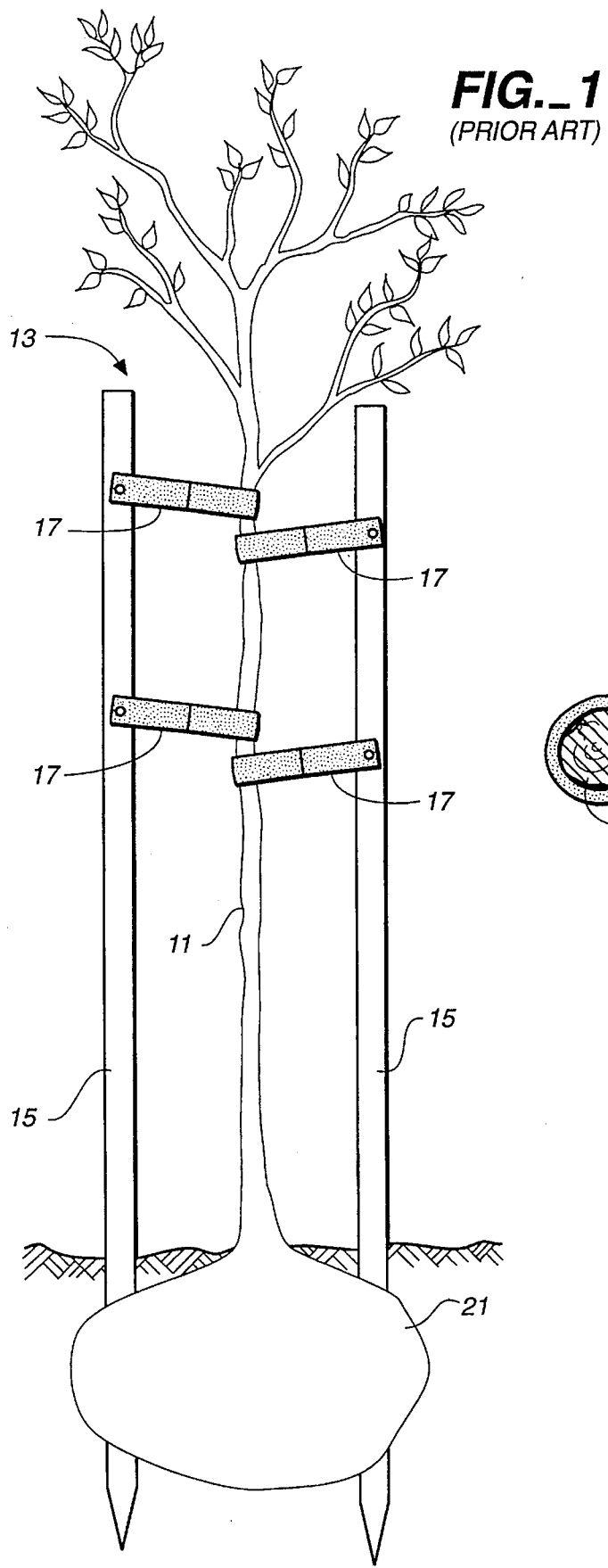
FIG._1
(PRIOR ART)
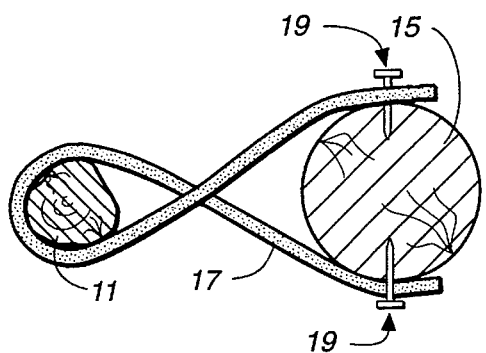
FIG._2
(PRIOR ART)

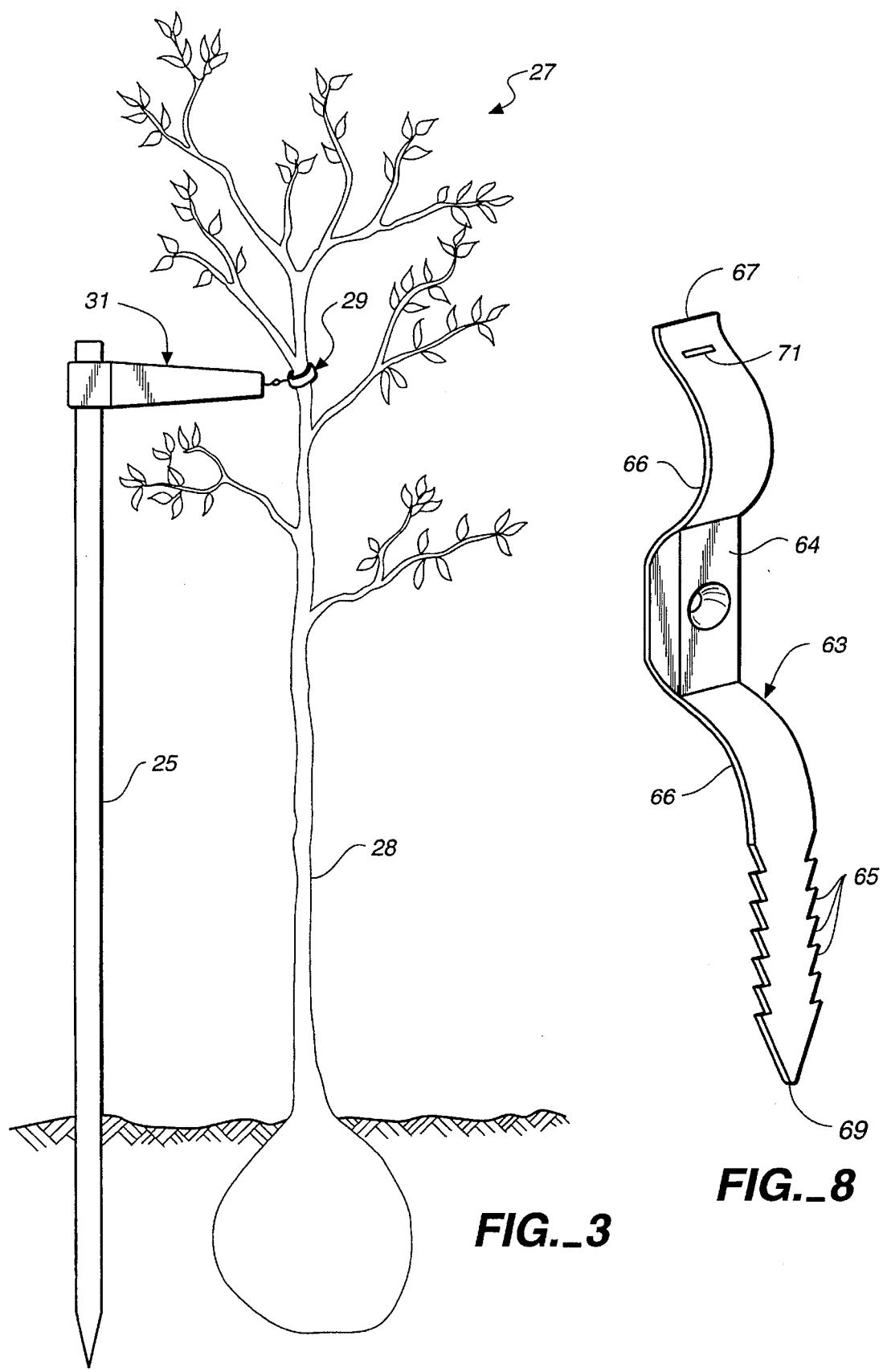
FIG._3
FIG._8

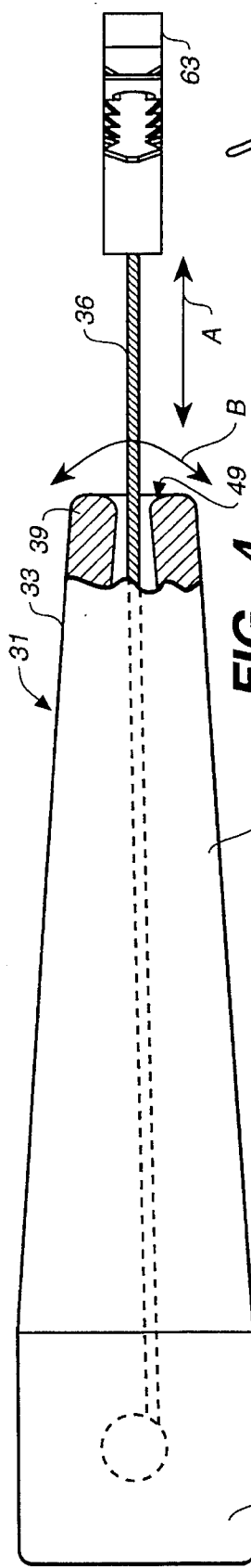
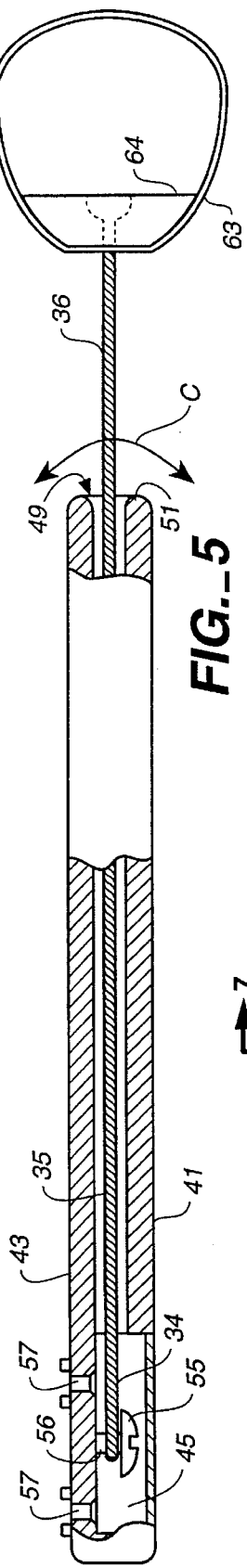
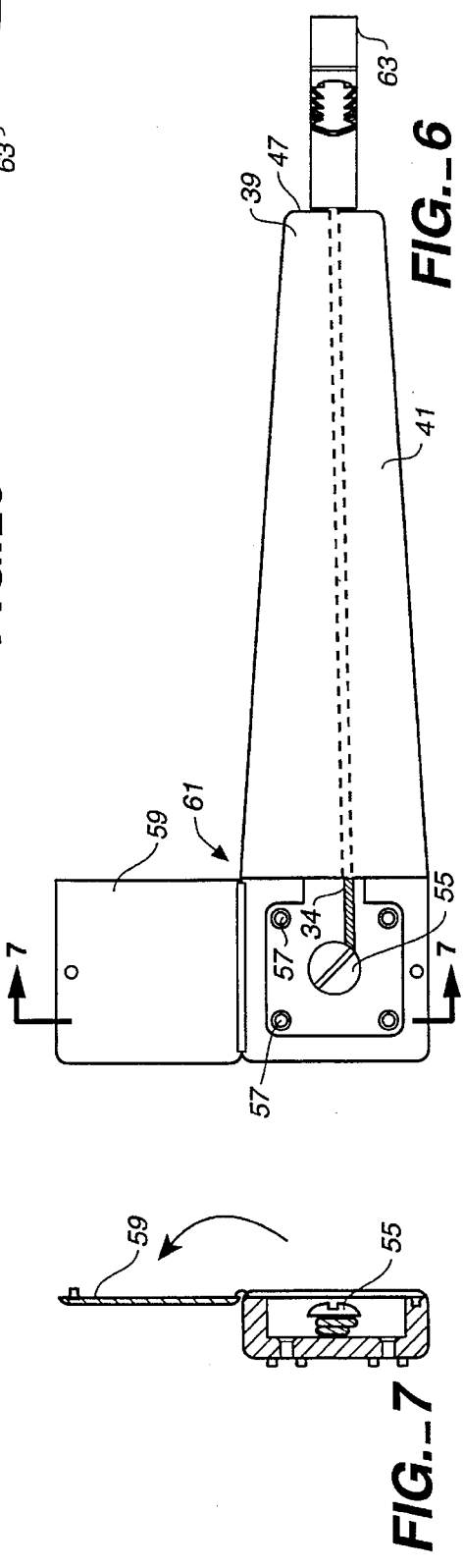

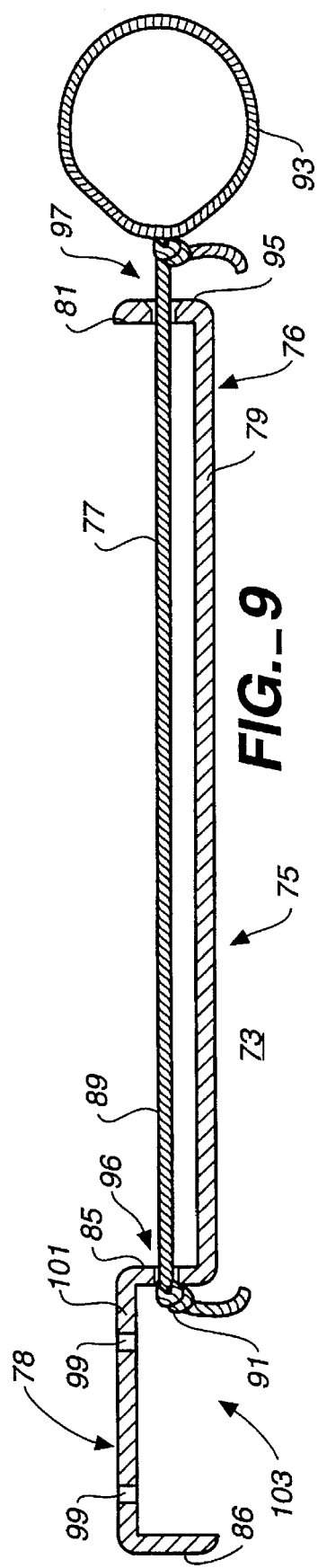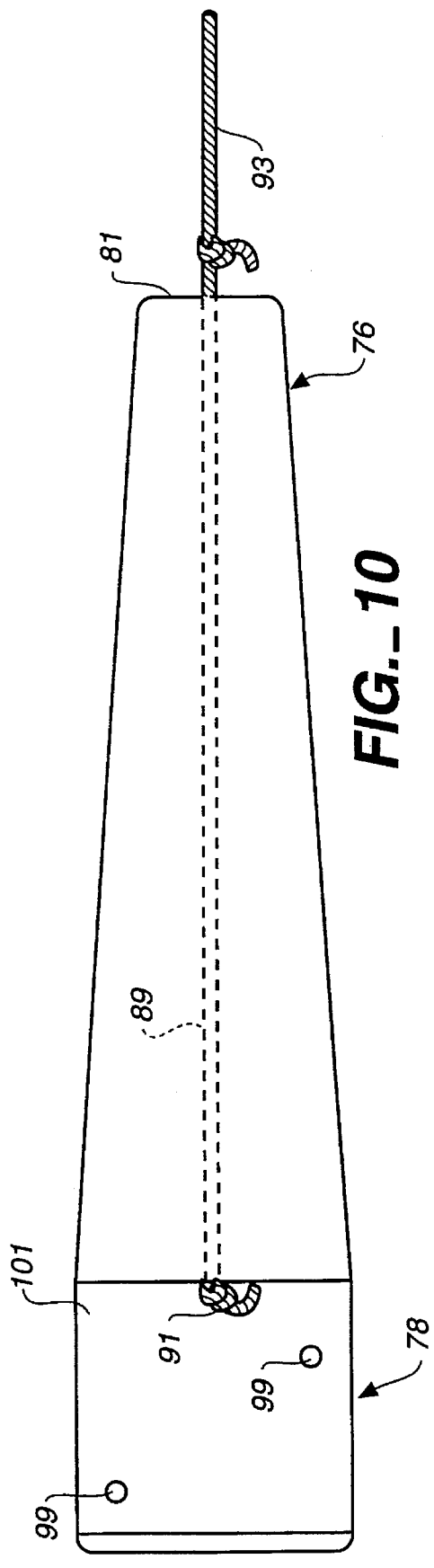

STAND-OFF DEVICE FOR YIELDINGLY SUPPORTING A TREE TO A TREE SUPPORT STAKE

This application is a continuation of application Ser. No. 08/184,988, filed Jan. 24, 1994.

BACKGROUND OF THE INVENTION

The present invention generally relates to the care and maintenance of young trees, and more particularly relates to the practice of staking young trees to keep them in an upright position.

Staking of a young tree most commonly involves strapping the tree to one or more stakes to keep the tree from swaying in the wind. The usual approach to staking a tree in the ground is to strap the tree's trunk to two stakes set well apart in the soil on opposite sides of the tree. For a very young tree in a planter box with limited space, a single stake is normally used. This is usually a smaller temporary stake strapped directly to the tree's trunk. The tree is kept in an upright position by staking until it is strong enough to support its own weight, and until it can withstand normal wind conditions without damage or breakage.

Such known staking methods have disadvantages which are detrimental to the tree's health and proper growth. First, it is known that swaying caused by wind stimulates growth, and promotes root development and the ability of a tree to strengthen itself. If staked in accordance with the aforementioned conventional methods, a young tree will not be permitted to sway below the point where the straps engage the tree. The development of the tree will thereby be inhibited, with the lower portion of the tree remaining relatively thin, a condition known as "reverse taper." A tree experiencing a reverse taper condition may lean or fall over if and when the supporting stakes become broken or are removed.

Another disadvantage o known staking methods is that the straps used to tie the tree trunk to the stakes often are, due to inattention or lack of knowledge of the care giver, too tight. A strap that is too tightly wound can girdle the trunk, thereby inhibiting the flow of nutrients through the trunk which in turn may inhibit proper growth. A conventionally staked tree should regularly be maintained to prevent the straps from becoming too tight as the tree grows.

Also, if a tree has a temporary stake wrapped immediately next to its trunk, the stake will over time tend to cause the tree trunk to curve instead grow straight. This is because the closely adjacent stake permanently shades one side of the tree.

The present invention overcomes the above-mentioned disadvantages of conventional staking methods by providing a device for supporting a young tree to a stake which holds the tree in an upright position, but which also allows the tree to sway sufficiently in the wind to promote the growth, strength, and the health of the tree. At the same time, the invention prevents excessive sway which could lead to damage or breakage. The invention further reduces the need for maintenance by reducing or eliminating the need to periodically loosen the tree ties and by facilitating adjustments when needed. Thus, the possibility of damage to the tree trunk is minimized. The device of the invention still further provides a support device for a young tree that can be used in place of a temporary stake, but which creates a stand-off distance between the tree and the support stake thereby reducing the amount of growth distorting shadow cast on the tree.

SUMMARY OF THE INVENTION

The invention is a stand-off device for yieldingly supporting a tree to a tree support stake. It has an elongated body for maintaining a stand-off distance between the tree support stake and the supported tree, and cord means, preferably in the form of an elastomeric cord, that has one end captured in its elongated body. The cord means yieldingly extends from its captured end through a cord guideway associated with the elongated body and thence out through the body's distal end. The portion of the cord means extending beyond the body's distal end provides an accessible tie end for tying to the trunk of a tree, which can be done either directly or preferably indirectly by means of a separate tree tie attached to the cord's tie end. Suitably, the separate tree tie can be in the form of a self-locking serrated strap, the ends of which can easily be secured around the tree trunk. It is not required that the tree tie (or the end of the cord means, if separate tree tie is not used) tightly girdle the tree; all that is required is that the tie loosely encircle the tree such that the tension in the cord keeps the tree upright at the distal end of the body in a windless condition.

Anchor means disposed in the elongated body hold the captured end of the cord means. Preferably, the anchor means is a rotatable member, such as a screw, which can be rotated to adjust the tension in the cord so as to control the permitted sway of the tree held by the stand-off device. While the anchor means is preferably disposed at the base end of the device, it will be appreciated that the anchor means could be located elsewhere. For example, the anchor means could be placed near the elongated body's distal end and the cord caused to extend through the cord guideway from the body's distal end to its base end, then around a bearing post and back to its distal end. This would provide more cord length and therefore greater range for the tree to sway.

The base end of the elongated body of the stand-off device is provided with stake attachment means for attaching the body to a vertical tree support stake so that the device projects perpendicularly from the stake. Stake attachment means can suitably be accessible screw holes whereby the base end of the body can simply be screwed directly onto the side of a stake. However, it is understood that other suitable stake attachment means can be provided, for example, the base of the body could be provided with slotted holes for receiving different-sized U-bolts for clamping to stakes of various sizes.

When the stake is driven into the ground next to a tree, the stand-off device can be attached such that the distal end of the device immediately faces the tree at a suitable height. Once tied with tie cord of the cord means, the tree will be able to sway against the tension in the cord means in any direction about and to the side of the device. Therefore, it is a primary object of the invention to provide a stand-off device for supporting a tree to a tree support stake that keeps the tree at a stand-off distance from the stake, that permits the tree to sway with the wind, and that otherwise holds the tree in an upright position. It is a further object of the invention to provide a device that does not tightly gird the tree, that uses only one support stake, that is easy to install, and that can be manufactured at low cost. Other objects of the invention will be apparent from the following specification and claims.

DESCRIPTION OF THE DRAWINGS

FIG. 1 is a side elevational view of a tree and tree stake arrangement in accordance with the prior art.

FIG. 2 is a top plan view in cross-section of the prior art tree stake arrangement of FIG. 1 showing the strapping of one of the stakes to the tree.

FIG. 3 is a side elevational view of a tree supported by a tree stake and the stand-off device in accordance with the present invention.

FIG. 4 is a front elevational view of the stand-off device in accordance with the present invention showing the extension of the device's elastomeric cord.

FIG. 5 is a top plan view, in partial cross-section, of the stand-off device of FIG. 4.

FIG. 6 is a front elevational view, in partial cross-section and on a reduced scale, of the stand-off device of FIG. 4 showing the access cavity and the tension adjustment screw therein which anchors the captured end of the device's elastomeric cord.

FIG. 7 is a cross-sectional view of the stand-off device shown in FIG. 6 taken along lines 7—7.

FIG. 8 is a perspective view of the serrated strap tree tie at the end of the elastomeric cord as shown in FIGS. 4–6.

FIG. 9 is a top plan view of an alternative embodiment of a stand-off device in accordance with the present invention.

FIG. 10 is a front elevational view of the stand-off device of FIG. 9.

DETAILED DESCRIPTION OF THE ILLUSTRATED EMBODIMENT

Referring now to the drawings, FIGS. 1 and 2 show a conventional prior art approach to staking a young tree, wherein trunk 11 of tree 13 is held to stakes 15 by straps 17, each of which is tied to one of the stakes as shown in FIG. 2 by wrapping the strap around the tree trunk, crisscrossing the ends, and nailing at 19 the criss-crossed ends to the opposite sides of the stake. With straps pulling from each direction, the tree is tightly girded with the object of preventing the tree from swaying in the wind. The stakes for this purpose are usually driven into the ground opposite each other in line with prevailing winds. Because they also serve to anchor the roots, the stakes are shown as being driven through the tree's root ball 21.

The arrangement shown in FIGS. 1–2 is to be contrasted with the tree stake and stand-off device of the invention shown in FIG. 3, wherein stand-off device 31 attached to the top of stake 25 has yieldable cord means, the end of which is tied loosely to trunk 28 of tree 27 at a suitable location 29. The tree in FIG. 3 is allowed to sway in the wind in just about any direction about the distal end of the stand-off device when the tree is pulled by the wind against the tension of the cord means. As the wind dies down, the tree is restored by the cord means to its original upright position shown in FIG. 3. By allowing the tree to sway in this manner, a reverse taper condition will be avoided and the tree's growth and overall health will otherwise be promoted.

FIGS. 4–8 show the construction of the stand-off device in FIG. 3 in greater detail. Specifically, stand-off device 31 is seen to have an enclosed elongated body 33 and cord means in the form of elastomeric cord 35. The body, which is suitably fabricated of molded plastic, has a base end 37, distal end 39, front wall 41, and back wall 43, and further has a cord guideway which runs the length of the body, that is, from access cavity 45 at base end 37 to the body's distal end 39. Elastomeric cord 35 is seen to extend through this cord guideway and thence out through the distal end of the body. The guideway forms an opening or aperture 47 at the distal end, the corners 51 of which are preferably rounded to facilitate lateral swinging movements of the cord.

Tension adjustment screw 55 in the access cavity 45 is a rotatable member that serves as an anchor means for anchoring the captured end 34 of the cord, and can be rotated to take up or pays the cord in order to adjust the cord's tension. Specifically, and as best illustrated in FIG. 5, the captured end of the cord is secured to shank 56 of the screw, such that when the screw is turned clockwise the tension in the cord is decreased, and when the screw is turned counterclockwise the cord's tension is decreased. The screw is suitably a machine screw tapped into the body's back wall 43 to provide a friction fit so that the screw can only be turned by a screwdriver, and not by the tension in the cord.

Stake attachment means are provided at base end 37 of the elongated body in the form of four screw holes 57 in back wall 43 which are accessible through the front of access cavity 45. As hereinafter described, these screw holes provide a means for easily screwing the base of the body to the side of a support stake as shown in FIG. 3.

Access cavity 45 can suitably be covered by a cover plate 59 hinged at 61 which can be opened to install the device on a stake or to access tension adjustment screw 55, but which is otherwise closed to shield the adjustment screw. The appearance of the stand-off device is generally enhanced by the cover plate, in that, when the cover plate is closed the stand-off device will have a very simple and uninterrupted profile.

Tie end 36 of elastomeric cord 35 is terminated by self-locking tree tie 63 which is illustrated in greater detail in FIG. 8. It is noted that tree tie 63 provides an enlargement at the end of the tie end of the cord which prevents the cord from inaccessibly being drawn back through the body's distal end. The tree tie is comprised of strap 66 which is suitably a rubber or plastic part having serrated edges 65, back end 67, and tip 69. The strap is secured, such as by gluing, to bracing block 64 which, by knotting tie end 66 of cord 35 behind the block, serves to hold tree tie 63 to the cord. The tree tie can be easily secured about a tree trunk by wrapping strap 66 about the trunk, inserting tip 69 of the strap through locking slot 71 in the strap's back end 67, and cinching the strap through the locking slot to a desired loop size. The serrated edges of the strap will prevent disengagement unless the strap is manually manipulated to remove the strap's tip from the locking slot.

FIGS. 9 and 10 illustrate a simplified version of the invention wherein the elongated body 75 of device 73 can be fabricated of a stamped metal part. The elongated body has a distal end 76 and a base end 78 and further has a cord guideway 77 which is an open guideway formed by bent perpendicular walls of the body, namely, the body's front wall 79, end wall 81, and intermediate wall 85. Both end wall 81 and intermediate wall 85 have apertures 96, 97 for receiving elastomeric cord 89. The cord's captured end 91 is knotted such that it is retained behind wall 85 while tie end 93 of the cord accessibly extends beyond wall 81, where it is tied in a loop so that it can receive a separate tree tie. As in the previously described embodiment, corners 95 of aperture 97 are rounded to enhance the cord's ability to follow lateral movements of a tree as the tree sways in the wind.

Tension in the elastomeric cord 89 can be adjusted in the FIGS. 9 and 10 embodiment by simply re-knotting captured end 91 of the elastomeric cord. It is noted that wall 85, 86 and 101 generally form an open access cavity 103 in which the captured end of the cord can be accessed. Screw holes 99 in back wall 101 provide means for attaching the base end of the elongated body to a stake as shown in FIG. 3.

Use of the stand-off device of the invention will now be described in reference to FIG. 3 and the embodiment of the invention described in FIGS. 4–8. Stand-off device 31, which is suitably approximately 10 inches in length, but which can be made in other lengths tailored to particular applications, is attached at a suitable height to stake 25 by screwing base end 37 of the body to the stake using screw holes 57. Suitably, this is done after the stake is driven vertically into the ground adjacent to the tree 27, suitable about 8 inches from the tree. After the stake is driven in the ground and the stand-off device is attached thereto, the distal end 39 of the device's body should be in close proximity to the tree such that serrated tree tie 63 at the end of elastomeric cord 35 can be wrapped around the trunk of the tree and fastened in the self-locking manner above described. As above noted, the tree tie need not, and indeed should not tightly gird the tree's trunk, but should rather be loosely fitted. In a windless condition, the tree will be held upright by the device in the position shown in FIG. 3, provided the elastomeric cord is suitably tensioned. However, in windy conditions, the tree will be allowed to sway and move about the distal end of the device's body by virtue of the lateral and axial extendibility of the cord as denoted by arrows A, B and C shown in FIGS. 4 and 5, wherein arrow A shows axial extendibility, and arrows B and C show lateral extendibility. The tree tie 63 can be periodically loosened if required by manually manipulating the serrated tip to back it out through the tie's locking slot 71. When the tree no longer requires support, the device can be removed and reused with another tree. It is further noted that the tree tie is an expendable part which can be replaced as required.

It shall be understood that other embodiments of the invention are possible which are not illustrated in the accompanying drawings, but which still fall within the spirit of the invention. For example, the cord may be provided which is not entirely elastomeric, but which may simply have elastomeric portions which yields when the tree sways about the stand-off device. Alternatively, the cord may be a non-elastic cord, the captured end of which is attached to a spring-loaded, yielding part within the body. Also, as above noted, the captured end of the cord may be anchored elsewhere within the body, for example, closer to the distal end. Therefore, the invention should not be limited to the particular embodiments described herein, except as necessitated by the following claims.

What we claim is:

1. A standoff device for yieldingly supporting a tree to a tree support stake, said standoff device comprising a substantially rigid body for maintaining a standoff distance between the tree support stake and the supported tree, said body having a base end, and a distal end spaced from said base end, cord means having a captured end attached to said body and a free end extending from the distal end of said body for tying to the trunk of a tree, the free end extending from the distal end of said body for tying end of said body to permit a tree tied thereby to sway about said distal end, and stake attachment means associated with said body for attaching the base end of said body to a tree support stake.

2. The standoff device of claim 1 wherein said cord means is an elastomeric cord.

3. The standoff device of claim 1 further including tension adjustment means in said body for adjusting the tension in said cord means.

4. The standoff device of claim 3 wherein said tension adjustment means includes an accessible rotatable member to which the captured end of said cord means is affixed and which can be rotated to take up and pay out said captured end.

5. The standoff device of claim 1 wherein said cord means has a tie end accessibly extending from the distal end of said body and wherein said tie end is tied in a loop for receiving a separate tree tie.

6. The standoff device of claim 1 wherein said cord means has a tie end accessibly extending from the distal end of said body and wherein a tree tie element is secured to the tie end of said cord means.

7. The standoff device of claim 6 wherein said tree tie element is a self-locking serrated strap.

8. A standoff device for yieldingly supporting a tree to a tree support stake, said standoff device comprising a substantially rigid elongated body for maintaining a standoff distance between the tree support stake and the supported tree, said elongated body including a base end having cord anchor means and a distal end spaced from said base end and having a cord aperture, an elastomeric cord having a captured end anchored to the cord anchor means at the base end of said body and a free tie end that elastically extends from the body's distal end through said cord aperture so that the free tie end of said elastomeric cord is accessible for tying to the trunk of a tree, and stake attachment means associated with said body for attaching the base end of said body to a tree support stake.

9. The standoff device of claim 8 wherein said cord anchor means is comprised of an accessible rotatable member for taking up and paying out the captured end of said cord for adjusting the tension therein.

10. The standoff device of claim 9 wherein said rotatable member is a screw threadably engaged in the base end of said body.

11. The standoff device of claim 8 wherein the free tie end of said elastomeric cord is tied in a loop for receiving a separate tree tie.

12. The standoff device of claim 8 wherein a tree tie element is secured to the free tie end of said cord.

13. The standoff device of claim 12 wherein said tree tie element is a self-locking serrated strap.

14. The standoff device of claim 9 wherein said body has a cord guideway between the base and distal ends thereof, and wherein said cord guideway terminates at an accessible cavity at the base end of said body, the rotatable member of said cord anchor means being accessibly disposed in said cavity.

15. The standoff device of claim 14 wherein a hinged cover plate covers said accessible cavity whereby the rotatable member is accessed for adjusting the tension of said cord by opening said cover plate.

16. A standoff device for yieldingly supporting a tree to a tree support stake, said standoff device comprising a cord having a captured end and a free tie end and wherein at least portion of said cord is elastomeric, a substantially rigid elongated body for maintaining a standoff distance between the tree support stake and the supported tree, said elongated body having a base end, a distal end opposite said base end, and a cord guideway between said base and distal ends for receiving an elastomeric portion of said cord, said body further having cord anchor means for anchoring the captured end of said cord thereto and a cord aperture at said distal end through which the free tie end of said cord elastically extends for tying the cord to a trunk of a tree, and stake attachment means associated with said body for attaching the base end of said body to a tree support stake.

17. The standoff device of claim 16 wherein the cord anchor means is disposed at the base end of said elongated body.

18. The standoff device of claim 16 wherein said cord anchor means is comprised of an accessible rotatable member for taking up and paying out the captured end of said cord for adjusting the tension therein.

19. A standoff device for yieldingly supporting a tree to a tree support stake, said standoff device comprising an elongated body for maintaining a standoff distance between the tree support stake and the supported tree, said elongated body having a front wall, a back wall, a base end, a distal end, and a cord guideway bounded by said front and back walls and extending through said body between the base and distal ends thereof, said base end having an enlarged access cavity which communicates with said cord guideway, the from wall of said body being open at said access cavity, and said distal end having a cord aperture, a rotatable member disposed in said access cavity, an elastomeric cord extending through the cord guideway and thence through the cord aperture of said elongated body, said cord having a captured end anchored to the rotatable member in the body's access cavity whereby said rotatable member can be actuated to take up and pay out said cord for adjusting the tension therein, and said cord further having a tie end that extends from the body's distal end for tying to a trunk of a tree, the cord aperture at the distal end of said body being sized to act as a stop for an enlargement at the tie end of said cord, and stake attachment means accessible through said access cavity for attaching the base end of said body to a tree support stake.

20. The standoff device of claim 19 wherein said stake attachment means includes screw holes in the back wall of said body.

21. A standoff device for yieldingly supporting a tree to a tree support stake, said standoff device comprising a substantially rigid elongated body for maintaining a standoff distance between the tree support stake and the supported tree, said elongated body having a base end and a distal end opposite said base end, a tension adjustable elastomeric cord having a free tie end and being anchored within said body, the free tie end of said cord elastically extending from the body's distal end for tying to a trunk of a tree and being retained such that it accessibly remains in front of the body's distal end when it is not tied to a tree, and stake attachment means associated with said body for attaching the base end of said body to a tree support stake.

* * * * *

UNITED STATES PATENT AND TRADEMARK OFFICE
CERTIFICATE OF CORRECTION

PATENT NO. : 5,568,700
DATED : October 29, 1996
INVENTOR(S) : Veneziano et al.

It is certified that error appears in the above—identified patent and that said Letters Patent is hereby corrected as shown below:

Claim 10, Col. 6, line 43, delete "a".

Claim 19, Col. 7, line 29, delete "from" and insert --front--.

Claim 1, col. 5, line 62, delete "extending from the distal end of said body for tying end" and insert -- of said cord means being retractably extensible from the distal end --.

Signed and Sealed this

Twenty-fifth Day of February, 1997

Attest:

BRUCE LEHMAN

*Attesting Officer*   *Commissioner of Patents and Trademarks*